(12) United States Patent
Ben Haha et al.

(10) Patent No.: US 9,321,682 B2
(45) Date of Patent: Apr. 26, 2016

(54) PROCESS FOR PRODUCING A BELITE CEMENT HAVING A HIGH REACTIVITY AND A LOW CALCIUM/SILICATE RATIO

(71) Applicant: HEIDELBERGCEMENT AG, Heidelberg (DE)

(72) Inventors: Mohsen Ben Haha, Heidelberg (DE); Tim Link, Weimar (DE); Frank Bellmann, Weimar (DE); Horst-Michael Ludwig, Weimar (DE)

(73) Assignee: HEIDELBERGCEMENT AG, Heidelberg (DE)

( * ) Notice: Subject to any disclaimer, the term of this patent is extended or adjusted under 35 U.S.C. 154(b) by 0 days.

(21) Appl. No.: 14/409,504

(22) PCT Filed: Jun. 10, 2013

(86) PCT No.: PCT/EP2013/001690
§ 371 (c)(1),
(2) Date: Dec. 19, 2014

(87) PCT Pub. No.: WO2013/189573
PCT Pub. Date: Dec. 27, 2013

(65) Prior Publication Data
US 2015/0166409 A1   Jun. 18, 2015

(30) Foreign Application Priority Data

Jun. 20, 2012 (EP) .................................... 12004620

(51) Int. Cl.
*C04B 7/345* (2006.01)
*C04B 111/00* (2006.01)

(52) U.S. Cl.
CPC ..... *C04B 7/3453* (2013.01); *C04B 2111/00215* (2013.01); *Y02P 40/121* (2015.11); *Y02P 40/148* (2015.11)

(58) Field of Classification Search
CPC .................... C04B 7/3453; C04B 7/43; C04B 2111/00215
USPC ....................................................... 106/638
See application file for complete search history.

(56) References Cited

U.S. PATENT DOCUMENTS

| | | |
|---|---|---|
| 5,509,962 A | 4/1996 | Tang |
| 8,226,763 B2 | 7/2012 | Beuchle et al. |
| 8,226,764 B2 | 7/2012 | Beuchle et al. |
| 8,382,892 B2 | 2/2013 | Beuchle et al. |
| 2015/0038318 A1 | 2/2015 | Del-Gallo et al. |

FOREIGN PATENT DOCUMENTS

| | | |
|---|---|---|
| CN | 1232000 A | 10/1999 |
| CN | 1785876 A | 6/2006 |
| CN | 1887766 A | 1/2007 |
| CN | 102351444 A | 2/2012 |
| DE | 138 197 A1 | 10/1979 |
| DE | 34 14 196 A1 | 10/1985 |
| DE | 10 2005 037 771 A1 | 2/2007 |
| DE | 10 2005 037 771 B4 | 8/2007 |
| DE | 10 2007 035 257 B3 | 11/2008 |
| DE | 10 2007 035 258 B3 | 11/2008 |
| DE | 10 2007 035 259 B3 | 11/2008 |
| DE | 10 2009 018 632 A1 | 9/2011 |
| DE | 10 2009 018 632 B4 | 11/2011 |
| EP | 1 719 741 A1 | 11/2006 |
| EP | 2 243 754 A1 | 10/2010 |
| WO | WO 2007/017142 A2 | 2/2007 |
| WO | WO 2013/132163 A1 | 9/2013 |

OTHER PUBLICATIONS

Ishida et al., "A-Dicalcium Silicate Hydrate: Preparation, Decomposed Phase, and Its Hydration", J. Am. Ceram. Soc., vol. 76, No. 7 (1993), pp. 1707-1712.
International Preliminary Report on Patentability, PCT/EP2013/001690, Dec. 31, 2014, 6 pgs.
International Search Report, PCT/EP2013/001690, Sep. 24, 2013, 2 pgs.
Kim et al., "Influence of Minor Ions on the Stability and Hydration Rates of β-Dicalcium Silicate", J. Am. Ceram. Soc., vol. 87, No. 5 (2004), pp. 900-905.
Jernejcic et al., "Thermal Decomposition of α-Dicalcium Silicate Hydrate", Thermochimica Acta, vol. 20 (1977), pp. 237-247.
Miyazaki et al., "Crystallographic Data of a New Phase of Dicalcium Silicate", J. Am. Ceram. Soc., vol. 81, No. 5 (1998), pp. 1339-1343.
Toraya et al., "Simulated annealing structure solution of a new phase of dicalcium silicate $Ca_2SiO_4$ and the mechanism of structural changes from α-dicalcium silicate hydrate to $α_L$'-dicalcium silicate via the new phase", Acta Cryst. Section B58 (2002), pp. 613-621.
Hjorth et al., "Belite in Portland Cement", Cement and Concrete Research, vol. 1 (1971), pp. 27-40.
Garbev et al., "First Observation of α-$Ca_2[SiO_3(OH)](OH)$-$Ca_6[Si_2O_7][SiO_4](OH)_2$ Phase Transformation upon Thermal Treatment in Air", J. Am. Ceram. Soc., vol. 91, No. 1 (2008), pp. 263-271.
Barnes et al., "Composition of Portland Cement Belites", Cement and Concrete Research, vol. 8 (1978), pp. 559-564.
Ishida et al., "Innovative Processing for Cement Materials", Innovative Processing for Cement Materials, MRS Bulletin/Nov. 2001, pp. 895-898.
S. N. Gosh, "Hydration of Polymorphs of Dicalcium Silicate", il cement, vol. 3 (1985), pp. 139-146.
Internet Abstract SIGMA ALDRICH "reagent-grade", http://www.sigmaaldrich.com/technical-service-home/product-portfolio.html, retrieved Dec. 22, 2015, 4 pgs.

*Primary Examiner* — Anthony J Green
(74) *Attorney, Agent, or Firm* — Paul D. Strain, Esq.; Strain & Strain PLLC

(57) ABSTRACT

The present invention relates to building materials, in particular a method for the production of a binder for concrete, mortar or plaster, and a binder produced according to this method as well the use thereof.

19 Claims, 2 Drawing Sheets

PROCESS FOR PRODUCING A BELITE CEMENT HAVING A HIGH REACTIVITY AND A LOW CALCIUM/SILICATE RATIO

CROSS-REFERENCE TO RELATED PATENT APPLICATIONS

This application is a National Stage of International Application No. PCT/EP2013/001690, filed Jun. 10, 2013, which is based upon and claims the benefit of priority from prior European Patent Application No. 12004620.6, filed Jun. 20, 2012, the entire contents of all of which are incorporated herein by reference in their entirety.

The present invention relates to building materials, in particular a method for the production of a binder for concrete, mortar or plaster, and a binder produced according to this method as well the use thereof.

Cement as an hydraulic binder is an important industrial product that consists to a large extent of Portland cement clinker. This clinker is produced by sintering a mixture of lime, sand, clay and correctve materials at approximately 1450° C. After the high-temperature reaction, the following foreign oxide-containing phases are present: alite ($Ca_3SiO_5$, also known as $C_3S$), belite ($Ca_2SiO_4$, also known as $C_2S$), aluminate ($Ca_3Al_2O_6$, also known as $C_3A$) and ferrite ($Ca_2(Al_xFe_{1-x})_2O_5$, also known as $C_4AF$). Here, belite primarily occurs in the form of the β polymorph. This phase is considered as being relatively slow reacting, with a low contribution to early strength.

Hydraulic reactivity describes the reaction of a binder with water, forming a solid material. By contrast to alite, belite hydration takes place slowly over several months and years.

It is known that the reactivity of belite with water can be improved by mechanochemical activation (DD 138197 A1), fast cooling after the burning process (DD138197 A1 and DE 3414196 A1) and the integration of foreign oxides (U.S. Pat. No. 5,509,962 A and DE 3414196 A1). Moreover, as well as the β variant of belite, other polymorphs are known, which have a better (α, α'H, α'L and x) or poorer reactivity (γ).

From H. Ishida, S. Yamazaki, K. Sasaki, Y. Okada, T. Mitsuda, [alpha]-Dicalcium Silicate Hydrate: Preparation, Decomposed Phase, and Its Hydration, J. Am. Ceram. Soc. 76, p 1707-1712, 1993, a method for the production of α-dicalcium silicate hydrate (α-$C_2SH$) at 200° C. by a two-hour-long hydrothermal treatment of burnt lime (CaO) and silicic acid for laboratory syntheses (degree of purity p.a) is known. In the temperature range of 390-490° C., α-$C_2SH$ is converted into various $C_2S$ modifications that pass into the al phase when heated further to 920-960° C. and form β-$C_2S$ when cooling. What is disadvantageous here is the high proportion of inert γ-$C_2S$.

In DE 10 2009 018 632, a method for the production of a belite-containing binder is disclosed, in which an intermediate product that was produced at 120-250° C. by hydrothermal treatment of the starting material with a Ca/(Si+Al) molar ratio of between 1.5 and 2.5 is subjected to reaction grinding at 100-200° C. for between 5 minutes and 30 minutes. It is disadvantageous that the reaction grinding is a non-energy-efficient step. Furthermore, only by adding superplasticizers a sufficient level of compressive strength can be achieved after the hardening.

DE 10 2005 037 771 discloses a method for the production of belite cement in which α-dicalcium silicate hydrate (α-$C_2SH$) arises at 100-300° C. by a hydrothermal treatment of the starting material that contains CaO and $SiO_2$ in a Ca/Si molar ratio of 1.5-2.5. In the temperature range between 500 and 1000° C., α-$C_2SH$ is converted into hydraulically reactive $C_2S$ modifications (belite cement). The disadvantage of this is that the burning process must be carried out at a comparatively high temperature (over 500° C.). These high temperatures moreover reduce the reactivity of the binder.

The object was therefore to propose a method for the production of binders, with which an increased level of reactivity of the binder that is based on a belite phase can be achieved, in order to thereby produce high-performance cements having a high content of these phases. Thus, substantially lower carbon dioxide emissions should be achieved than with conventional Portland cements that have a high alite proportion.

The object is solved by a method for the production of a binder, comprising the following steps:
a) providing a starting material made from raw materials that have a Ca/Si molar ratio of 1.5 to 2.5, in the determination of which the components that act in an inert manner during the hydrothermal treatment in the autoclave remain unconsidered,
b) mixing the raw materials,
c) hydrothermal treatment of the starting material mixture produced in step b) in the autoclave at a temperature of 100 to 300° C. and a retention time of 0.1 to 24 h, wherein the water/solids ratio is from 0.1 to 100,
d) annealing the intermediate product obtained in step c) at 350 to 495° C., wherein the heating rate is 10-6000° C./min and the retention time is 0.01-600 minutes, wherein, during the mixing b) and/or in the following steps, 0.1 to 30% by weight of additional elements and/or oxides are added.

According to the method according to the invention, the molar ratio of calcium to silicon is to be from 1.5 to 2.5, preferably approximately 2. When determining this ratio, the compounds that act in an inert manner during the production method are not considered.

Primary and/or secondary raw materials may be used as the starting material. In a preferred embodiment, quartz, sand or gravel are used as raw materials for the starting material. Raw materials that contain CaO as well as $SiO_2$ are particularly preferred, such that the desired Ca/Si ratio is already present. If the desired Ca/Si ratio is not present, the materials have to be adjusted with respect to their chemical composition before further treatment by adding further reaction partners such as solids containing calcium or silicon in order to set the required Ca:Si ratio of 1.5 to 2.5. Portlandite ($Ca(OH)_2$) or burnt or unburnt lime, for example, are suitable for this. As a rule, the raw materials are also optimised with respect to particle size and particle size distribution by mechanical or thermal treatment, wherein the thermal treatment may also lead to an optimisation of the chemical composition.

In a preferred embodiment, fine grain material is selected as the starting material, the largest grain of which is preferably 0.1 mm maximum. For this, the finer grain fractions from the reprocessing of cement-containing binders in building materials such as old concretes and cements are in particular used. A finer starting material is advantageous both with respect to the conversion speed and also with respect to the effort expended for the grinding of the completed cement. With a correspondingly fine starting material, grinding may be unnecessary.

During the mixing of the raw materials b) or the subsequent process steps, the adding of additional elements or oxides in an amount from 0.1 to 30% by weight is required. Sodium, potassium, boron, sulphur, phosphorous or combinations thereof are preferred as these additional elements/oxides, which are also jointly referred to as foreign oxides. Alkaline salts or alkaline earth salts and/or hydroxides are suitable for this, such as $CaSO_4 \cdot H_2O$, $CaSO_4 \cdot \frac{1}{2}H_2O$, $CaSO_4$, CaHPO$_2$.2H$_2$O, Ca$_3$P$_2$O$_8$, NaOH, KOH, Na$_2$CO$_3$, NaHCO$_3$, K$_2$CO$_3$, MgCO$_3$, MgSO$_4$, Na$_2$Al$_2$O$_4$, Na$_3$PO$_4$, K$_3$PO$_4$, Na$_2$[B$_4$O$_5$(OH)$_4$].8H$_2$O etc. In a preferred embodiment, the starting material mixture has a P/Si molar ratio of approximately 0.05 and/or an S/Si molar ratio of approximately 0.05 and/or a Ca/K molar ratio of approximately 0.05.

The raw material mixture, which is optionally pre-treated as described, can optionally be mixed, i.e. seeded, with crystal nuclei that contain calcium silicate hydrates. Here, the reaction can be accelerated by seeding with 0.01-30% by weight of different compounds containing calcium silicate hydrate, in particular with α-2CaO.SiO$_2$.H$_2$O, afwillite, calcio-chondrodite, β-Ca$_2$SiO$_4$ and other compounds.

The produced mixture of the raw materials, which is optionally seeded as described above, is then subjected in step c) to a hydrothermal treatment in the autoclave at a temperature of 100 to 300° C., preferably 150° C. to 250° C. Here, a water/solids ratio of 0.1 to 100, preferably 2 to 20, and retention times of 0.1 to 24 hours, preferably 1 to 16 hours, are preferably selected.

The mixture of the raw materials can be burnt in an additional step. This step is particularly preferred for the use of industrial by-products or relatively poorly reactive or coarse materials as raw materials. Here, temperatures of 400 to 1400° C., preferably 750 to 1100° C., are suitable. The burning duration lasts 0.1 to 6 hours, preferably 1 hour. By burning the raw materials, the advantage arises that materials that would otherwise hardly be able to be used or would be unable to be used (e.g. crystalline ash and slag etc.) can be rendered useful in a targeted manner by improved/greater ability for conversion into the intermediate product α-C$_2$SH in the autoclave being enabled (by deacidification and/or dehydration . . . ). Furthermore, the advantage is provided that precursor phases (e.g. inert belite) may be produced in a targeted manner, which have products according to step c) and d) that have particularly high x-C$_2$S, α-C$_2$S content and/or at least one reactive, X-ray amorphous phase. The advantage of using belite as the raw material for the autoclave process is an improved phase composition of the final binder compared to unburnt raw materials.

The product produced by mixing, and optionally burning of the raw materials, is, according to step c), converted into the intermediate product containing at least one calcium silicate hydrate and, optionally, further compounds, by hydrothermal treatment. This takes place in an autoclave at a temperature of 100 to 300° C. and a retention time of 0.1 to 24 hours, wherein the water/solids ratio is 0.1 to 100.

In the following step d), the intermediate product produced in this way is annealed at a temperature of 350° C. to 495° C. Here, the heating rate amounts to 10-6000° C./min, preferably 20-100° C./min, and particularly preferred approximately 40° C./min, and the retention time amounts to 0.01-600 min, preferably 1-120 min and particularly preferred 5-60 min. To reduce the proportion of inert γ-C$_2$S, an additional hold time during the heating at 400-440° C. of 1-120 min, preferably 10-60 min, has proved to be expedient. No reaction grinding takes place.

The desired, hydraulically reactive binder is obtained after cooling. The binder according to the invention contains 30-100% of the following compounds: x-Ca$_2$SiO$_4$, X-ray amorphous compounds of variable composition, β-Ca$_2$SiO$_4$ and reactive γ-Ca$_2$SiO$_4$ having a phase-specific degree of hydration of, mostly, at least 50% in the first 7 days after being mixed with water. The BET surface of the binder should range from 1 to 30 m$^2$/g. The SiO$_2$ tetrahedrons in the binder have an average degree of condensation of less than 1.0. The water content in the binder is less than 3.0% by weight. This binder is optionally ground to a desired level of fineness or grain size distribution in a manner that is known in itself. Grinding can be unnecessary in the case of fine raw materials and appropriate grain size distribution.

The binder preferably contains x-Ca$_2$SiO$_4$ at a content of >30% by weight and at least one X-ray amorphous phase having a content of >5% by weight, wherein all proportions of the binder add up to 100%.

Hydraulically highly reactive binders based on Ca$_2$SiO$_4$ can be produced by the method according to the invention. These are distinguished by highly reactive polymorphs and X-ray amorphous phases being present and the binder possessing a high, specific surface. Furthermore, the binder also contains γ-Ca$_2$SiO$_4$. The formation of this polymorph is prevented by fast clinker cooling during the production of Portland cement, since this polymorph does not contribute to strength development. It was surprisingly found that, in contrast to the hitherto existing production methods, this phase, produced by the method according to the invention at a temperature of <500° C., shows a good level of reactivity.

In contrast to DE 10 2009 018 632, no reaction grinding takes place, since this step is energy-intensive and products produced in this way have a lower level of reactivity than the products produced with the method described here.

By contrast with DE 10 2007 035 257, DE 10 2007 035 258 and DE 10 2007 035 259, the binder produced according to the method according to the invention has an average degree of condensation of the SiO$_4$ tetrahedron of less than Q=1.0 and a maximum water content of 3% by weight.

The invention is to be illustrated with the aid of the following examples, without, however, being limited to the specifically described embodiments. Insofar as nothing else is specified or occurs in a necessarily different manner from the context, percentage values relate to the weight, and, in case of doubt, the total weight of the mixture.

The invention also relates to all combinations of preferred embodiments, insofar as these are not mutually exclusive. The specifications "approximately" or "approx." in connection with a numerical figure mean that values that are higher or lower by 10%, or values that are higher or lower by 5% and in each case values that are higher or lower by 1% are included.

EXAMPLE 1

Figure 1:
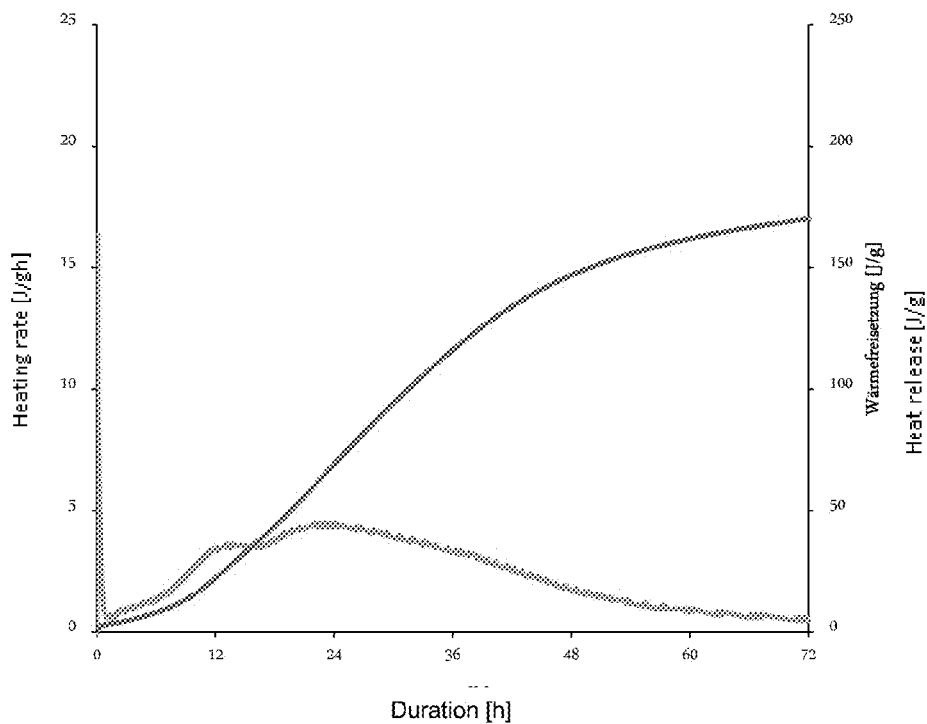
FIG. 1 shows the measured heating rate and heat release of a first binder according to the subject matter of the present application.

Production of a mixture of CaCO$_3$, highly dispersed SiO$_2$ and CaSO$_4$.2H$_2$O, wherein the molar ratios of Ca/Si and S/Si were 2.0 and 0.05 respectively. This mixture was burnt under the following conditions: Temperature 1000° C., burning time 5 hours, 3 burnings. After the addition of 5% by weight of seed nuclei from α-2CaO.SiO$_2$.H$_2$O, an autoclave treatment followed for 16 hours at 200° C., in which the mixture was converted into an intermediate product. This contained 90% by weight α-2CaO.SiO$_2$.H$_2$O, 2% by weight calcite and 8% by weight amorphous components. The subsequent annealing at 475° C. transferred the intermediate product into a reactive binder, consisting of 63% by weight x-$Ca_2SiO_4$, 15% by weight β-$Ca_2SiO_4$, 7% by weight γ-$Ca_2SiO_4$, 2% by weight calcite and 13% by weight X-ray amorphous components. The hydraulic reactivity was established in the heat flow calorimeter. FIG. 1 shows the measured heating rate and heat release.

EXAMPLE 2

Figure 2:
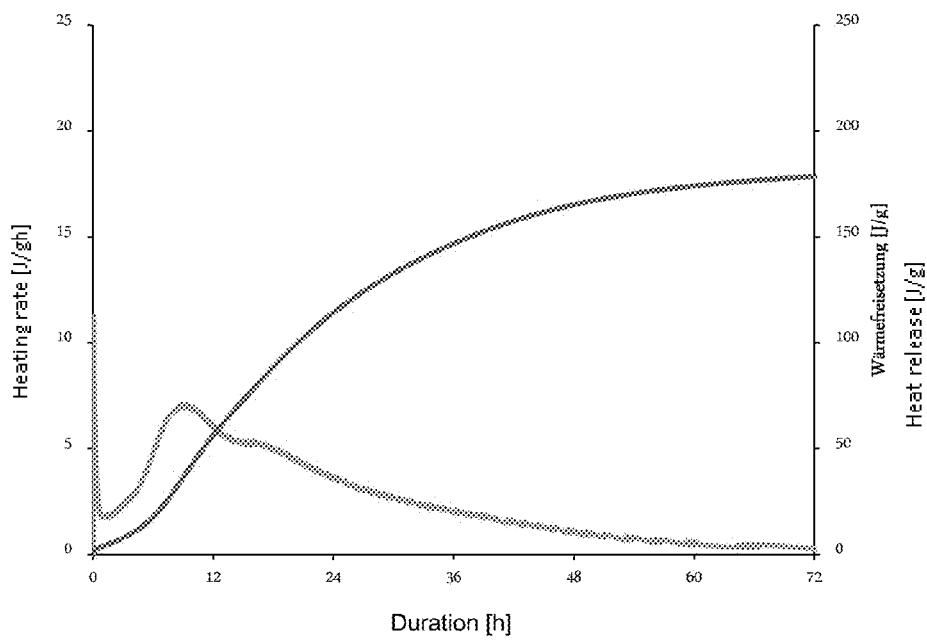
FIG. 2 shows the measured heating rate and heat release of a second binder according to the subject matter of the present application.

Production of a mixture of $CaCO_3$, highly dispersed $SiO_2$ and KOH, wherein the molar ratios of Ca/Si and K/Ca were 2.0 and 0.05 respectively. This mixture was burnt under the following conditions: temperature 1000° C., burning time 5 hours, 3 burnings. After the addition of 5% by weight of seed nuclei from α-$2CaO.SiO_2.H_2O$, an autoclave treatment followed for 16 hours at 200° C., in which the mixture was converted into an intermediate product. This contained 84% by weight α-$2CaO.SiO_2.H_2O$, 1% by weight calcite, 4% by weight wollastonite and 11% by weight X-ray amorphous components. The subsequent annealing at 475° C. with a hold time of 1 hour during the heating at 420° C. transferred the intermediate product into a reactive binder, consisting of 53% by weight x-$Ca_2SiO_4$, 8% by weight β-$Ca_2SiO_4$, 13% by weight γ-$Ca_2SiO_4$, 1% by weight calcite, 4% b.w. wollastonite and 21% by weight X-ray amorphous components. The hydraulic reactivity was established in the heat flow calorimeter. FIG. 2 shows the measured heating rate and heat release.

EXAMPLE 3

Figure 3:
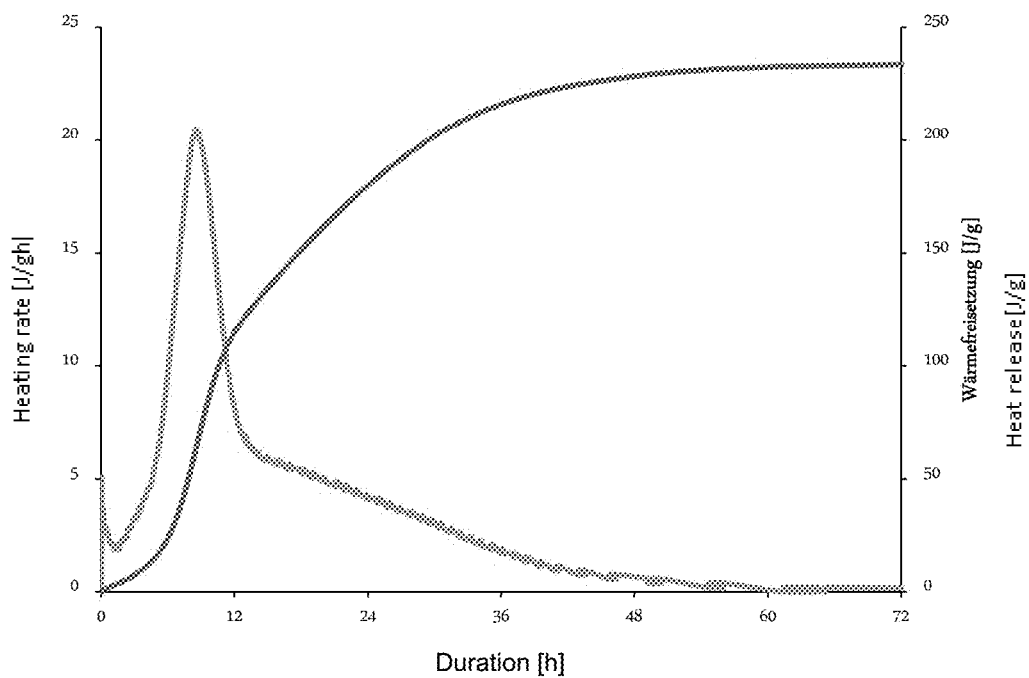
FIG. 3 shows the measured heating rate and heat release of a third binder according to the subject matter of the present application.

Production of a mixture of $Ca(OH)_2$, highly dispersed $SiO_2$ and $CaHPO_4.2H_2O$, wherein the molar ratios of Ca/Si and P/Si were 2.0 and 0.05 respectively. After the addition of 5% by weight of seed nuclei from α-$2CaO.SiO_2.H_2O$, an autoclave treatment followed for 16 hours at 200° C., in which the mixture was converted into an intermediate product. After the reaction in the autoclave, the produced intermediate product contained 87% by weight α-$2CaO.SiO_2.H_2O$, 2% by weight calcite and 11% by weight X-ray amorphous components. The subsequent annealing at 475° C. for 60 minutes (heating rate of 50° C./min) transformed the intermediate product into a reactive binder, consisting of 48% by weight x-$Ca_2SiO_4$, 13% by weight γ-$Ca_2SiO_4$, 2% by weight calcite and 37% by weight X-ray amorphous components. FIG. 3 shows the heating rate and heat release measured in the heat flow calorimeter.

The invention claimed is:

1. Method for the production of a binder by a hydrothermal treatment, the method comprising the following steps:
   a) providing a starting material made from raw materials that has a Ca/Si molar ratio of 1.5 to 2.5, wherein, in determining the molar ratio, components that act in an inert manner during the hydrothermal treatment in an autoclave remain unconsidered,
   b) mixing the raw materials to form a starting material mixture,
   c) hydrothermal treatment of the starting material mixture produced in step b) in the autoclave at a temperature of 100 to 300° C. and a retention time of 0.1 to 24 h, wherein a water/solids proportion is 0.1 to 100, to form an intermediate product,
   d) annealing the intermediate product obtained in step c) at 350 to 495° C., wherein a heating rate is 10-6000° C./min and a retention time is 0.01-600 minutes, wherein, during the mixing b) and/or in the following steps, 0.1 to 30% b.w. of additional elements and/or oxides are added.

2. Method according to claim 1, wherein, between the mixing of the starting materials b) and the hydrothermal treatment c), an additional burning process is carried out at temperatures of 400 to 1400° C.

3. Method according to claim 1, wherein a hold time of 1-120 minutes is set for dehydration during the heating in step d) at a temperature of 400-440° C.

4. Method according to claim 1, wherein the additional elements are selected from the group consisting of sodium, potassium, boron, sulphur, phosphorous and combinations thereof.

5. Method according to claim 4, wherein alkaline salts and/or earth alkaline salts and/or hydroxides are used as a source for the additional elements and/or oxides.

6. Method according to claim 5, wherein the alkaline salts and/or earth alkaline salts and/or hydroxides are selected from the group consisting of $CaSO_4.H_2O$, $CaSO_4.½H_2O$, $CaSO_4$, $CaHPO_2.2H_2O$, $Ca_3P_2O_8$, NaOH, KOH, $Na_2CO_3$, $NaHCO_3$, $K_2CO_3$, $MgCO_3$, $MgSO_4$, $Na_2Al_2O_4$, $Na_3PO_4$, $K_3PO_4$, $Na_2[B_4O_5(OH)_4].8H_2O$ and mixtures thereof.

7. Method according to claim 1, wherein, before the hydrothermal treatment c), 0.01-30% by weight of seed nuclei containing calcium silicate hydrates are added to the mixture.

8. Method according to claim 3, wherein the additional elements are selected from the group consisting of sodium, potassium, boron, sulphur, phosphorous, and a combination thereof.

9. Method according to claim 4, wherein before the hydrothermal treatment c) 0.01-30% by weight of seed nuclei containing calcium silicate hydrates are added to the mixture.

10. Method according to claim 8, wherein before the hydrothermal treatment c) 0.01-30% by weight of seed nuclei containing calcium silicate hydrates are added to the mixture.

11. Binder obtained by a method according to claim 1.

12. Binder according to claim 11, wherein the binder contains 30-100% by weight of at least one of an X-ray amorphous phase (variable composition) and/or x-$Ca_2SiO_4$ and/or β-$Ca_2SiO_4$ and/or reactive γ-$Ca_2SiO_4$ with a phase-specific degree of hydration of at least 50% in the first 7 days after being mixed with water.

13. Binder according to claim 11, wherein it contains x-$Ca_2SiO_4$ having a content of >30% by weight and at least one X-ray amorphous phase having a content of >5% by weight, wherein all proportions of the binder add up to 100%.

14. Binder according to claim 11, wherein a BET surface of the binder ranges from 1 to 30 $m^2/g$.

15. Binder according to claim 11, wherein $SiO_2$ tetrahedrons in the binder have an average degree of condensation of less than 1.0.

16. Binding according to claim 11, wherein a water content is less than 3.0% by weight.

17. A concrete, mortar, or plaster comprising the binder according to claim 11.

18. Binder obtained by a method according to claim 3.

19. Binder obtained by a method according to claim 10.

* * * * *